United States Patent Office 3,059,371
Patented Oct. 23, 1962

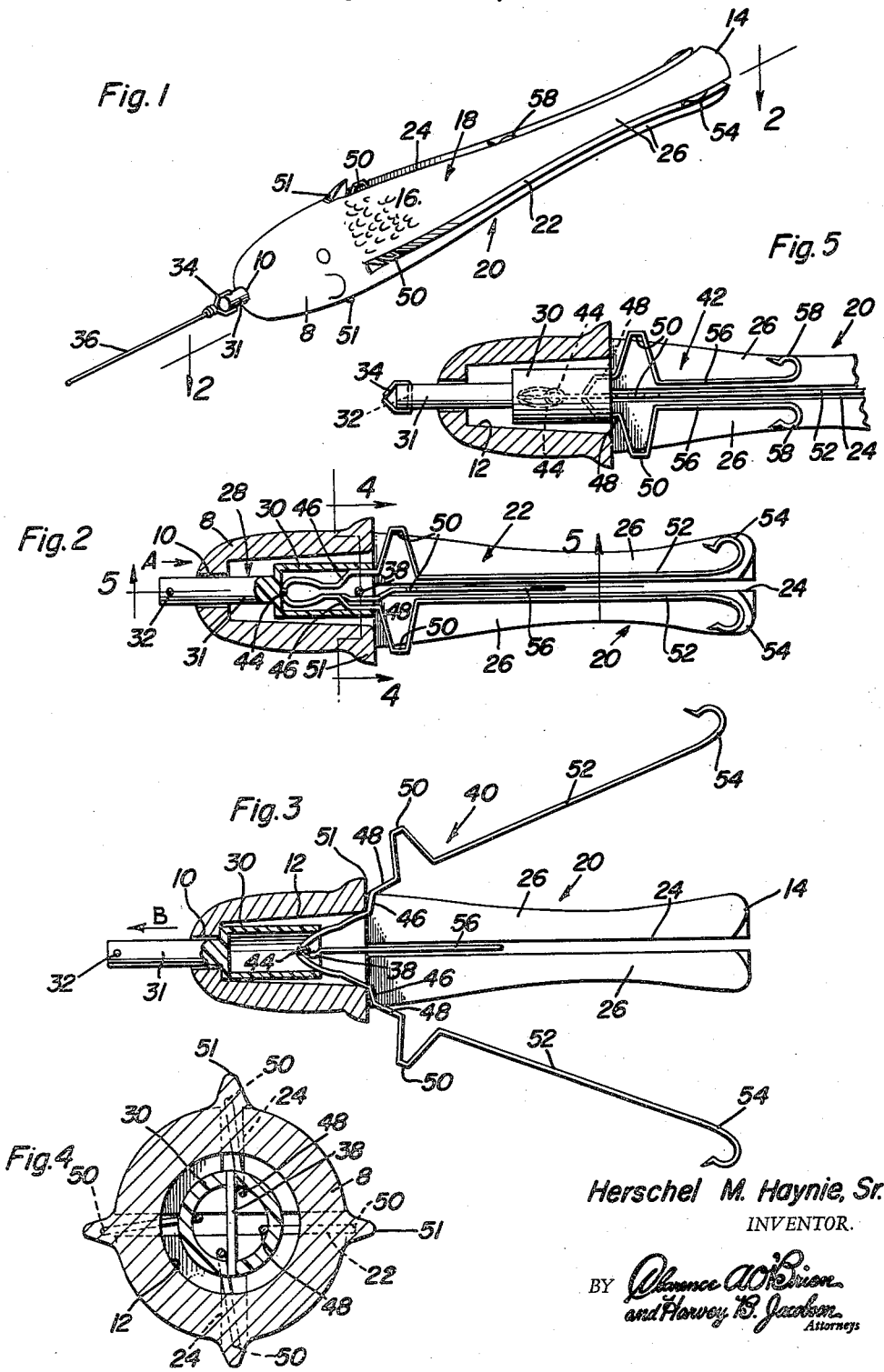
Oct. 23, 1962 — H. M. HAYNIE, SR — 3,059,371
FISHING LURE WITH CONCEALED EXPANSIBLE HOOKS
Filed Jan. 28, 1959
Herschel M. Haynie, Sr.
INVENTOR.

3,059,371
FISHING LURE WITH CONCEALED EXPANSIBLE
HOOKS
Herschel M. Haynie, Sr., 11748 Woodward St.,
Highland Park, Mich.
Filed Jan. 28, 1959, Ser. No. 789,568
2 Claims. (Cl. 43—35)

The present invention relates to an improved plug-type fishing lure which is constructed to carry and conceal expansible hooks embodied in and constituting unified fish hooking means, said means being cooperatively associated with a line controlled retaining and releasing device, cooperatively associated with and mounted in appropriately constructed hollow portions provided therefor in said lure.

Although the above-mentioned fish hooking means and the retaining and releasing device could be used, as in certain prior patents, without a lure, it is preferred that the lure and said means and device be combined to provide the over-all novel fishing device.

In carrying out a preferred embodiment of the invention the lure, construed as a unit by itself, comprises an elongated buoyant body or plug of appropriate material characterized by a forward head portion, a rearward tail portion, and an intervening body adjoining the head and tail portions. The body and tail portions are bifurcated to provide a pair of opposed furcations with a space therebetween. The individual furcations, in turn, are slotted or slitted lengthwise to provide complemental halves. Thus four circumferentially spaced equidistant slots are provided to accommodate and conceal the plurality of associated expansible and contractible spring hooks.

The aforementioned retaining and release device comprises, briefly, an elongated plastic, aluminum or suitable cup open at the rear end and closed at the front end to prevent mud and sediment from entering while trolling or being pulled through the water. The front end of the cup is provided with a forwardly extending stem which is slidably mounted in an opening provided therefor in the nose of the aforementioned head portion, said head portion having an axial socket to accommodate the cup. At least one twin-hook unit, preferably two, will be utilized.

The aforementioned retaining and releasing cup includes a portion which permits the cooperating portions of the hooks to be set manually to spring at the slightest nibble or, alternatively, for a more pronounced pull to prevent springing open when casting.

Other objects, features and advantages will become more readily apparent from the following description and the accompanying illustrative, but not restrictive, drawing.

In the drawing:

FIG. 1 is a perspective view of a fishing lure constructed in accordance with the principles of the invention and showing the manner in which the parts or components appear when the device is set to make a catch.

FIG. 2 is a view, with parts appearing in section and elevation, taken on line 2—2 of FIG. 1, looking in the direction of the arrows.

FIG. 3 is a view similar to FIG. 2 and showing the hooks extended.

FIG. 4 is an enlarged transverse section taken on line 4—4 of FIG. 2.

FIG. 5 is a fragmentary view with parts in section and elevation taken on line 5—5 of FIG. 2.

As briefly mentioned the lure comprises an elongated body or plug of appropriate material characterized by a suitably shaped head portion 8, the nose of which is provided with a guide bore or hole 10. This hole registers with a counterbore 12 which, as shown in the other views, provides a rearwardly opening socket. The reduced tail portion is denoted generally by the numeral 14 and the intermediate or body portion is designated at 16 (FIG. 1).

The body portion 16 and tail portion 14, as a unit, are bifurcated to define opposed parallel furcations denoted generally by the numerals 18 and 20. The intervening space is denoted at 22. Each furcation 18 or 20 is in turn bifurcated but here for convenience of description it is said that the furcation 18, for example, is provided with a lengthwise slit or slot 24, dividing the furcation into halves 26.

A pull operated portion of the device is denoted generally by the numeral 28 in FIG. 2. It is here shown as made of commercial plastics of an appropriate kind and as embodying a cylindrical elongated cup 30 the closed forward end of which is provided with an axial extension or stem 31. The forward end of the stem is provided at 32 with a hole to accommodate the tying loop 34 of the fishing line 36 thereto. The pull operated portion is of a length greater than the length of the socket and the cup is of a length considerably less than the length of the socket so that it is allowed to slide or reciprocate within the confines of the socket. The hollow portion of the cup is designated the receptacle portion. The open mouth of the cup is provided with a cross pin 38 which functions to retain the hook assembly and cup together in a manner illustrated in FIG. 3. There are two twin or dual fishhook units one of which 40 is shown in FIG. 3. The other twin unit is seen in FIG. 5 where it is denoted by the numeral 42. Basically these units are the same in construction except that the hook-equipped limbs of the unit 40 are considerably longer and reach to a point just inwardly of the rear end 14. The hooks in the unit 42 are relatively short and are movable in to and out of the body portion 16. To avoid complication in the use of reference numerals it is believed that since both units 40 and 42 are identical in construction except for proportions it is desirable that the same reference numerals designate the same or like parts for the two units 40 and 42. To this end and with respect to FIG. 3 where the construction is more clearly seen it will be evident that each unit is formed from a length of spring steel wire which is bent upon itself between its ends to provide an eye 44. The portions of the wire adjacent to the eye 44 are then bent obliquely as at 46 to define the significant retaining and releasing shoulders 48. These shoulders, in turn connect with coplanar outstanding somewhat V-shaped bent portions or bends 50 which provide manually usable finger-pieces for setting the trap and which also define a pair of outstanding shoulders or triggers and which when engaged by the rearward end of the head 8 (FIG. 2) trip the trap. The long limbs are denoted at 52 and terminate in oppositely or outwardly bent hooks 54 which may be provided with barbs or plain as desired. The shorter limbs 56 (FIG. 5) terminate in similarly constructed outwardly directed hooks 58 which may be plain or barbed. When the units 40 and 42 are grouped together they serve to provide four circumferentially spaced equidistant expansible and contractible simultaneously operable fishing hooks. When the device is set as seen in FIG. 2 the eyes 44 and shoulders 48 are caused to telescope into the receptacle portion of the cup 30. Therefore the shoulders and eyes straddle the retaining or coupling pin 38. This pin serves to couple the units 40 and 42 to the cup, that is to prevent separation when the trap is sprung as seen in FIG. 3. With the trap set as seen in FIG. 2 the hooked limbs 56 line up with the slots 24 while the hooked limbs 52 line up with the slots 22. As is evident, when the lure is taken by a victim fish, the pull exerted by the fish will result in the hook units 40 and 42 sliding from left to right, that is from the set position seen in FIG. 2 to the position seen in FIG. 3 whereupon all four hooks will spring out and forcibly land the hooks in the mouth of the fish, in a now generally well-known manner. More or less of the shoulders 48 may be telescoped into the receptacle portion of the cup. Therefore, it is possible to obtain a "set" wherein a light nibble will spring the trap; or, alternatively to make the "set" sufficiently strong that only a comparatively strong pull on the over-all lure by a larger fish will spring the trap. When the device is set as seen in FIG. 2 the essential parts of the two units 40 and 42 will be concealed in the hollow portions of the lure or plug. That is, only the outer tip portions of the fingerpieces 50 project beyond the plug surfaces (FIG. 1) the terminal ends of the hooks 54 and 58 being concealed. The fin-like lugs 51 which are ahead of and alined with their respective triggers or fingerpieces 50 render the latter substantially weedless.

It will be further evident that in setting the device it is necessary to slide the device or means 28 into the position seen in FIG. 2. To accomplish this it is necessary to hold the lure and the device 28 in such a manner that once the pin or stem 31 has been moved forwardly, it will be held in this position until the fingerpieces 50 are pressed in manually, thus retracting the limbs 52, after which the shoulder portions 48 may be shoved into the receptacle portion to the desired or regulated extent. Thus the shoulder portions 48 are collared and the limbs are retracted and ready to spring out when (as seen in FIG. 3) the pull actuated by the fish on the lure has withdrawn the shoulder portions from the receptacle portion and the inherent spring pressure of the limbs and other parts caused the limbs to spring out and set the hooks in the mouth of the fish. By providing both long and short hooks it is believed that chances of landing the fish are greatly enhanced.

Briefly, a description of use would be to simply set the lure by holding the stem 31 and lure between the thumb and forefinger, firmly pressing in the cup, then depressing the plurality of hooks by way of the fingerpieces 50. Then when a fish pulls rearwardly on the body portion and a forward pull is simultaneously exerted on the fishing line and said stem, the cup and fish hooking means will move forwardly until the laterally bent portions are engaged by the rear end of the head, separating the fish hooking means from the cup and releasing said limbs to permit them to spring apart to a fish catching position. The fingerpieces 50 may be also employed to depress the hooks to assist in releasing the hooks from the mouth of the fish without serious harm to the fish.

The fins 51 in front of the trippable fingerpieces 50 and the concealed hooks (when properly set) all cooperate with requisite nicety in giving the user a substantially weedless lure.

Minor changes in shape, size, material and rearrangement of components or parts may be resorted to in actual practice without departing from the spirit of the invention or scope of the invention as claimed.

What is claimed as new is as follows:

1. In combination, a plug shaped to represent a minnow and having a head portion, a body and tail portion, said body and tail portion being bifurcated and defining furcations and space therebetween, said head portion having an axial rearwardly opening recess defining a socket and communicating at its rearward open end with said space, also having an axial stem guide opening through the leading end of the head and also opening into the socket, a rigid cup wholly confined for limited forward and rearward sliding action in said socket, said cup being of a length slightly less than the depth of said socket, manually adjustable in said socket and closed and provided at its forward end with an axial stem slidingly mounted in said guide opening, a fishing line connected with said stem, unitary fish hooking means embodying at least two coplanar expansible and contractible springy wire limbs having free rearward ends provided with outwardly projecting hooks, the forward ends of said limbs being integrally joined together by a connecting eye, portions of the limbs adjacent said eye having opposed retaining shoulders, said eye and retaining shoulders being adapted to slide and telescope wholly into the receptacle portion of said cup, the wall of the cup forcibly pressing the limbs together in a manner to assume a contracted set position substantially concealed in the space between said furcations, said limbs having laterally bent portions adjacent said retaining shoulders projecting into said space and having outer end portions accessible beyond adjacent surfaces of said body portion and constituting finger pieces and which assist one in manually and forcibly pressing the limbs together when setting the fish hooking means.

2. The structure as defined in claim 1, and wherein said head portion is provided at the juncture thereof with the forward ends of the furcations with a pair of diametrically opposed coplanar surfaces perpendicular to the longitudinal axis of said cup, stem and socket, whereby when a fish pulls rearwardly on the body portion and a forward pull is simultaneously exerted on the fishing line and said stem, the cup and fish hooking means will move forwardly until the laterally bent portions are engaged by said flat surfaces, separating the fish hooking means from the cup and releasing said limbs to permit them to spring apart to a fish catching position.

References Cited in the file of this patent

UNITED STATES PATENTS

| | | |
|---|---|---|
| 330,793 | Lie | Nov. 17, 1885 |
| 616,209 | Stanek | Dec. 20, 1898 |
| 729,435 | Smith | May 26, 1903 |
| 985,659 | Clayton | Feb. 28, 1911 |
| 1,385,536 | Gleason | July 26, 1921 |
| 2,247,806 | Foley | July 1, 1941 |
| 2,589,343 | Cieslik | Mar. 18, 1952 |

FOREIGN PATENTS

| | | |
|---|---|---|
| 19,729 | Great Britain | 1903 |